(12) United States Patent
Veluvali et al.

(10) Patent No.: US 6,477,559 B1
(45) Date of Patent: Nov. 5, 2002

(54) METHOD AND APPARATUS FOR REMOTELY ACCESSING AN AUTOMATIC TRANSACTION PROCESSING SYSTEM

(75) Inventors: Sunil K. Veluvali, Sunnyvale; Nancy O. Slater, Fremont, both of CA (US); Kenneth T. Wong, San Jose, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/137,973

(22) Filed: Aug. 21, 1998

(51) Int. Cl.[7] .............................................. G06F 15/16
(52) U.S. Cl. ...................... 709/101; 709/328; 709/330; 709/315; 709/203; 713/201; 379/265.01 379/265.04
(58) Field of Search ................................ 709/310–332, 709/200–203, 100–108, 328–330; 713/1, 100, 101, 2, 200–202, 182–186; 379/266.08, 265.02, 265.01, 265.08, 265.13; 257/693

(56) References Cited

U.S. PATENT DOCUMENTS

| | | | | |
|---|---|---|---|---|
| 4,510,351 A | * | 4/1985 | Costello et al. ........ | 379/265.01 |
| 4,881,261 A | * | 11/1989 | Oliphant et al. ....... | 379/266.08 |
| 5,526,416 A | * | 6/1996 | Dezonno et al. ....... | 379/265.02 |
| 5,666,534 A | * | 9/1997 | Gilbert et al. ................. | 713/1 |
| 5,793,861 A | * | 8/1998 | Haigh ........................ | 257/693 |
| 5,961,588 A | * | 10/1999 | Cooper et al. .............. | 709/203 |
| 5,999,965 A | * | 12/1999 | Kelly ......................... | 709/202 |
| 6,094,678 A | * | 7/2000 | Nethercott et al. ......... | 709/220 |
| 6,101,531 A | * | 8/2000 | Eggleston et al. .......... | 709/206 |
| 6,192,121 B1 | * | 2/2001 | Atkinson et al. ....... | 379/265.01 |
| 6,226,377 B1 | * | 5/2001 | Donaghue .............. | 379/265.13 |
| 6,327,658 B1 | * | 12/2001 | Susaki et al. ............... | 713/716 |

* cited by examiner

*Primary Examiner*—St. John Courtenay, III
(74) *Attorney, Agent, or Firm*—Blakely, Sokoloff, Taylor & Zafman LLP (57) ABSTRACT

A method for accessing a transaction processing system. In one embodiment, the method includes the step of receiving a remote request for access to the transaction processing system from a client device. The method further includes the step of, in response to the remote request, executing at least one server function by a server, where the at least one server function includes performing a security check to authenticate the remote request.

22 Claims, 6 Drawing Sheets

FIG_1

FIG_3

FIG_4

FIG_5

FIG_6

METHOD AND APPARATUS FOR REMOTELY ACCESSING AN AUTOMATIC TRANSACTION PROCESSING SYSTEM

FIELD OF THE INVENTION

The present invention is in the field of transaction processing. More particularly, the present invention is in the field of processing electronic transactions such as telephone calls.

BACKGROUND OF THE INVENTION

Modern businesses rely increasingly on the ability of their customers to communicate with the business reliably and efficiently by telephone or computer. It is vital to the success of a business that high volumes of electronic transactions such as telephone calls and computer communications coming into the business be received and routed successfully.

An example of a business that relies particularly heavily on its transaction handling capability is a catalog retailer. Such a retailer employs a number of agents to handle customer calls with the assistance of a computer terminal. Typically, transaction handling hardware and software exists at some central location. This hardware and software performs functions such as receiving an incoming call, collecting information from a caller, and forwarding the caller to an appropriate agent based on the information. The agent may be at a location that is remote from the transaction handling hardware and software. The transaction handling hardware and software may also cause information related to the caller's account to appear on the computer screen when the call is routed to the agent and the agent is a human with a computer.

A catalog retailer may also use the transaction handling hardware and software to conduct business by computer over the internet.

A transaction handling system, including, transaction handling hardware and software, must be configured initially. For example, the number of agents, and the criteria for routing calls must be determined. Also, hardware of the system must be defined. Sometime during the life of the system, reconfiguration will typically be necessary. The system must be reconfigurable to allow for changes in the system over time. For example, it may become necessary to configure the system to perform different functions, to allow for different physical configurations such as the addition of more agents, or to change security characteristics. Reconfiguration usually involves both physical changes in the system and software changes to allow the system to function properly in its new configuration. For example, a physical change, such as the connection of new computer terminals or new integrated circuit cards typically involves reprogramming various components of the system to recognize and function with the new physical items.

In prior transaction handling systems, reconfiguration is cumbersome. This is due in large part to the fact that prior transaction systems that are located in various geographic areas are configured and controlled by discrete terminals in each geographic area. The various portions of the system are each hardwired to a terminal that allows access to configuration software of that portion. Each system portion may be substantially the same, but there is no mechanism for centralized control or data collection over all portions of the overall transaction processing system. Reconfiguration of prior art system may require a person to log on to a terminal in a particular geographic location for each portion of the system that is to be reconfigured. In some cases, the person reconfiguring the system must be familiar with a particular programming language and have access to core code of the system in order to reconfigure it. Also, the person reconfiguring the system may need to access the physical system, even if direct access for the purpose of adding a new physical component is not necessary.

In some cases specialized software programs may be required to reconfigure the system in such a way that the changes take effect without degradation of system performance and stability. Such software programs typically must be provided by the system supplier. Reconfiguration of prior systems is slow and possibly costly because specially trained personnel must perform the reconfiguration or special software must be supplied to perform reconfiguration. In some cases, the system may only be reconfigurable by the supplier of the system at the request of the system owner.

Another disadvantage of prior art transaction processing systems is the lack of centralized data collection facilities. If a user wishes to collect data about transactions at a particular location, that must be arranged through configuration of hardware and/or software at the location. It is not possible in prior systems to remotely collect information about transaction occurring at a particular location in the system.

SUMMARY OF THE INVENTION

Embodiments of the present invention provide a set of software routines for configuring an automated call center. Embodiments of the present invention also provide a set of software routines for configuring an automated transaction processing system that are openly and remotely accessible to application programs for remote configuration of the transaction processing system and remote data collection and retrieval.

A particular embodiment of the invention provides a method for accessing a transaction processing system. The method includes the step of receiving a remote request for access to the transaction processing system from a client device. The method further includes the step of, in response to the remote request, executing at least one server function by a server, where the at least one server function includes performing a security check to authenticate the remote request.

DETAILED DESCRIPTION

The following detailed description sets forth numerous specific details to provide a thorough understanding of the invention. One of ordinary skill in the art will appreciate, however, that the invention may be practiced without these specific details. In other instances, well-known methods, procedures, protocols, components, algorithms, and circuits have not been described in detail so as not to obscure the invention.

An apparatus and method for remotely configuring or reconfiguring an automated transaction distribution system is described herein. In one embodiment, the invention includes a group of application program interfaces (APIs) that can be openly accessed by a client computer of the system and used to reconfigure the call center.

Although particular embodiments of the invention are described herein as used in a telephone call processing system (e.g., a call center or an automated call distributor), the present invention may be used with any type of transaction processing system capable of handling various types of transactions. A particular transaction processing system may be capable of handling any number of transaction, such as telephone calls, electronic mail messages, voice mail messages, facsimiles, video sessions. and network sessions.

Figure 1:
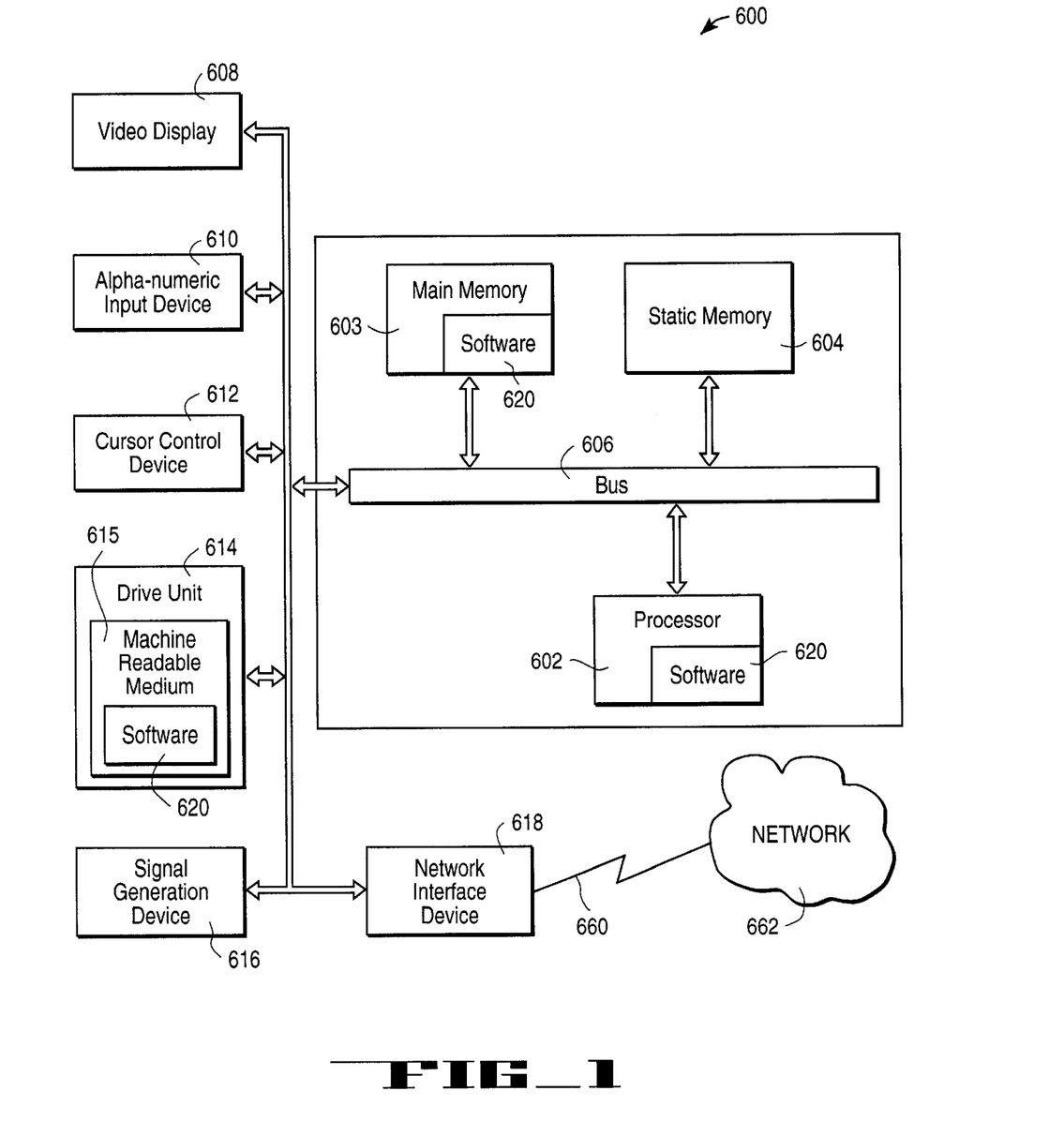
FIG. 1 is a block diagram of a machine in the exemplary form of a computer system within which is software for performing the methodologies of the present invention may operate

FIG. 1 is a block diagram of a machine in the exemplary form of computer system 600 within which is software for performing the methodologies discussed herein may operate. The methodologies of the present invention, as discussed herein, may operate with a machine having all of the components shown in FIG. 1, or with a machine having less components than those shown in FIG. 1.

Computer system 600 includes processor 602, main memory 603 and static memory 604, which communicates via bus 606. System 600 is further shown to include video display unit 608 (e.g., a liquid crystal display (LCD) or a cathode ray tube (CRT)). Computer system 600 also includes alphanumeric input device 610 (e.g., a keyboard), cursor control device 612 (e.g., a mouse), disk drive unit 614, signal generation device 616 (e.g., a speaker), and network interface device 618. Disk drive unit 614 includes machine-readable medium 615 on which software 620 is stored for executing each of the methodologies described herein. Software 620 is also shown to reside, at least partially, within main memory 603 and/or within processor 602. Software 620 may further be transmitted or received via network interface device 618. For example, network interface device may transmit or receive software 620 via carrier wave signals 660 to and from network 662.

For the purposes of this specification, the term "machine-readable medium" shall be taken to include any medium capable of storing or encoding a sequence of instructions for execution by a machine and that cause the machine to perform the methodologies of the present invention. The term "machine-readable medium" shall be taken to include, but not to be limited to, solid-state memories, optical and magnetic disks, and carrier wave signals.

Figure 2:
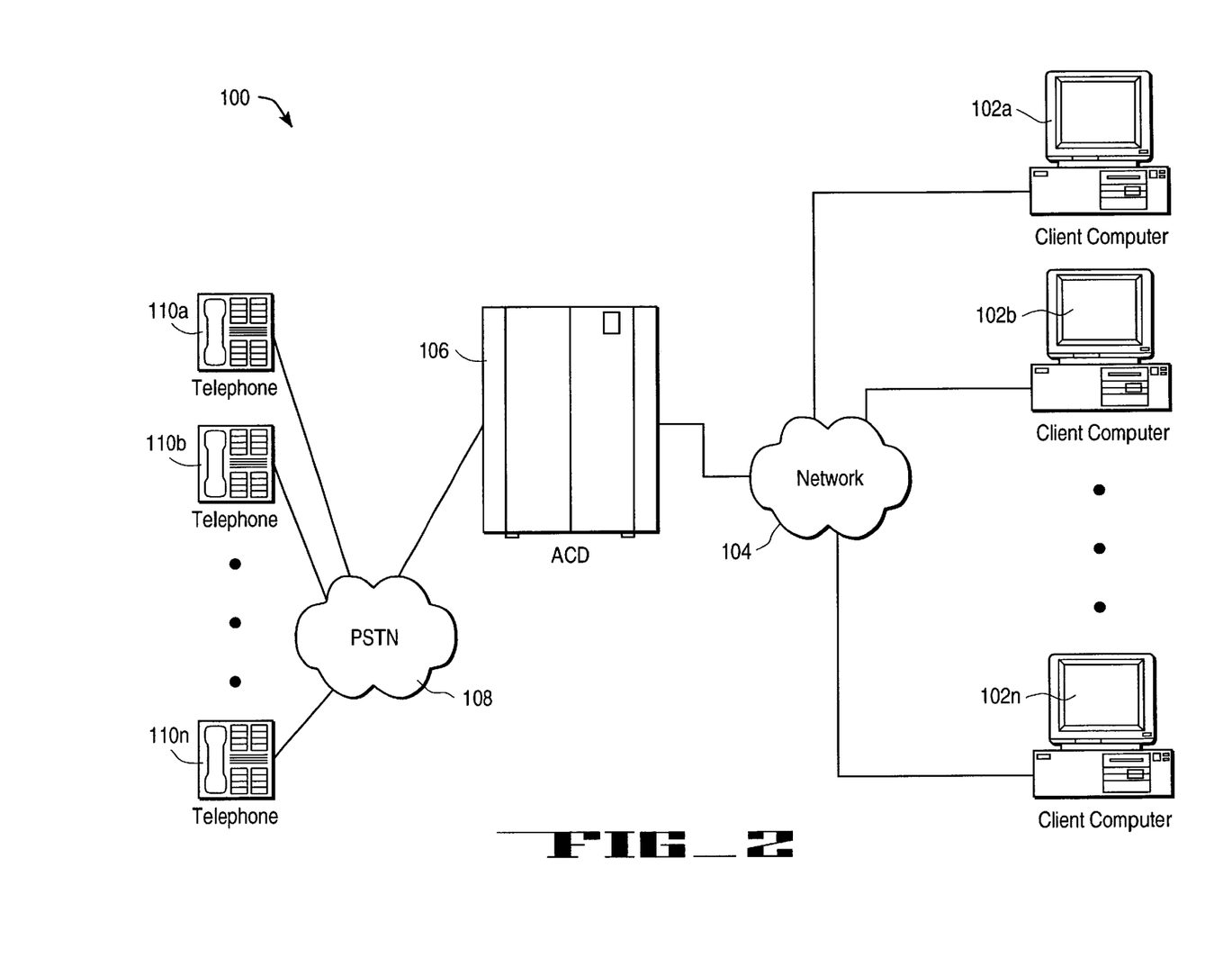
FIG. 2 is a block diagram of a transaction handling and distribution system for use with one embodiment of the present invention.

FIG. 2 is a block diagram of a telephone call handling and distribution system that may be used with the present invention. Telephones 110a through 110n are connected through public switched telephone network (PSTN) 108 to Automated Call Distribution System (ACD) 106. In this embodiment, ACD 106 includes a machine in the form of a computer, such as the machine of FIG. 1, for storing and executing machine-readable instructions. Telephones 110 may be any type of telephone commonly used in homes or in businesses. If telephones 110 are rotary telephones rather than push button telephones, however, telephones 110 may not be able to access all the functionality of system 100.

ACD 106 is an automated call handling and distribution unit that includes hardware and software for receiving and processing telephone calls through PSTN 108. ACD 106 performs multiple functions in connection with each telephone call received. For example, ACD 106 may associate a telephone call with a particular caller. ACD 106 may also log and store information relating to the particular telephone call. ACD 106 typically uses information received about the telephone call to route the telephone call to a particular client computer 102. For example, ACD 106 may query a human caller for a type of identifier such as a social security number. ACD 106 then uses the identifier to access existing records about the caller, decide which client computer 102 is appropriate to handle the call, and forward the call to the appropriate client computer 102. ACD 106 may also cause records relating to the particular caller to be accessed and displayed on the appropriate client computer 102. ACD 106 includes at least one processor (no shown) that performs the functions described and other functions.

Client computers 102a through 102n are each connected to each other and to ACD 106 through network 104. Client computers 102 may be physically located remotely from ACD 106. Some of client computers 102, for example, may be located in one state and some of client computers 102 may be located in another state while ACD 106 is located in a third state.

Other embodiments may have other configurations. For example, telephones 110 may directly access ACD 106, as may client computers 102.

Figure 3:
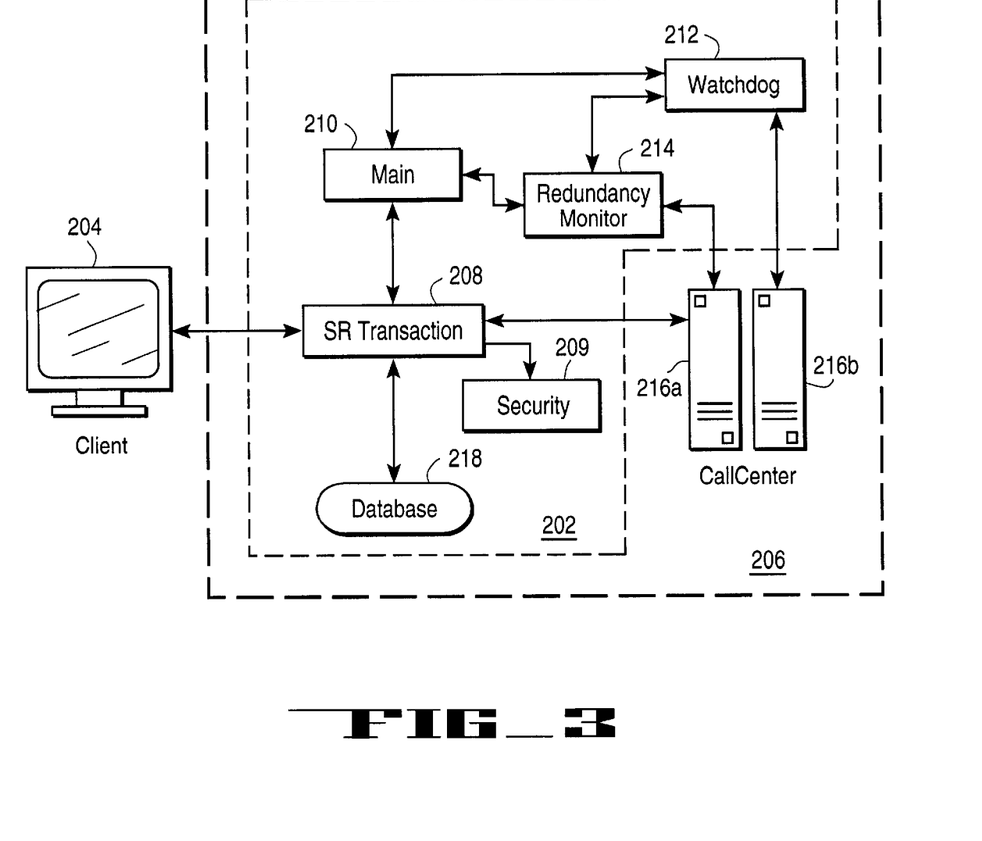
FIG. 3 is a block diagram of one embodiment of elements of a server.

FIG. 3 is a block diagram of a portion of one embodiment of system 100. FIG. 3 includes a single client computer 204 and ACD 206. ACD 206 includes server 202 and call center 216. Call center 216 includes redundant call centers 216a and 216b as explained more fully below.

In one embodiment, server 202 fulfills the requirements for a single point administrative interface between client computer 204 and ACD 206. In one embodiment, client computer 204 comprises a Windows 95® or Windows NT® based computer system. Windows 95® and Windows NT® are computer operating systems including graphical user interfaces available from Microsoft Corporation of Redmond, Wash. For example, Windows NT® is an operating system, sometimes referred to as simply NT®, that is a self-contained operating system with a built-in graphical user interface (GUI). The Windows NT® operating system may run on a variety of hardware platforms including those based on the Intel 80386®, i486®, and Pentium® microprocessors, as well as MIPS® microprocessors and multiprocessor computers. In one embodiment, a user, through a GUI on a display screen of client computer 204, performs an operation using server remote procedure call (RPC) transactions 208 as explained further below. Operations performed may include any operation requiring access to ACD 206 or database 218. Examples of operations include adding a system resource, adding a new system user, defining a new instrument in the system, changing characteristics of an instrument (such as a telephone), changing access characteristics (e.g., blocking all 900 numbers, or changing the access privileges of a user class), scheduling a system application to automatically run at certain times, or requesting data about transactions.

Typically, system configuration and/or reconfiguration includes all realtime changes to the operating status of the call center, including such things trunk and trunk group maintenance, work force administration, call routing setup, and general call center setup. In one embodiment, server 202 participates in a client/server architecture with the call center. In one embodiment there is a single server 202 for each call center. Server 202 may be used simultaneously by any number of client computers (clients). The clients and server 202, in one embodiment, are connected by a network and communicate using transmission control protocol/internet protocol (TCP/IP) as a protocol in both local area network (LAN) and wide area network (WAN) configurations. Therefore, client 204, or an equivalent client, has the ability to attach to server 202 with full functionality from the same geographical location or a remote geographical location.

Server 202 acts toward the client as a simple transaction processing monitor, hiding the location of database 218 and implementation details. Therefore the geometric increase in database connections resulting from multi-client multi-call center configurations is minimized.

In one embodiment, server 202 is implemented as an NT® service. NT® services are not associated with a particular client. A call center system startup routine starts server 202 automatically at boot time. Server 202 is available to all clients on the system who have appropriate NT® security rights, that is, those who have been given execute access to the server 202 by being assigned to a group that has access rights to execute server 202.

The basic components of server 202 are shown in FIG. 3. Server 202 is a process that runs continuously in the same address space as call center 216. In other embodiments, server 202 may run in a different address space from call center 216 and/or be remotely located from call center 216. In one embodiment, server 202 acts as a background task in the environment of call center 216. In one embodiment, a basic functionality of server 202 is to accept a client transaction request for modification of the environment of call center 216, validate that request, apply the request to database 218, apply that request to call center 216 and return. Any error conditions will be returned to client 204. In this embodiment, call center 216 is fully redundant. In other words, redundant call centers 216A and 216B completely duplicate the hardware and software of the call center for backup purposes.

One example of a client 204 request is a request to modify ACD 206 by adding a new integrated circuit (IC) card to add some functionality. After the IC card is physically installed, ACD 206 must be reconfigured to recognize the IC card and implement the new functionality.

Watch dog process 212 controls the start-up, shut-down, and redundancy functions of server 202. Main section 210 is responsible for initiating connections to database 218, making an RPC connection available to client 204, starting up persistent worker threads like redundancy monitor 214 and initiating the status of server 202 as an NT® service.

Redundancy monitor 214 comprises logic that monitors call center 216 and responds to changes in the backup/resynch status of call center 216 by communicating with server 202.

Server RPC (SR) transactions 208 are processes that consist of logic to update call center 216 and its configuration database (not shown). In one embodiment, there are in excess of 300 SR transactions 208. Before a SR transaction is allowed to access ACD 206, Security module 209 authenticates the request by confirming that the user and/or equipment attempting the access had the appropriate permission. Different users, equipment or software programs may have permission to access ACD 206 at different levels. For example, one type of permission may allow only the viewing of data, while another type of permission allows reconfiguration of any part of the entire system. In one embodiment, security module 209 examines each incoming request for access and an independent security unit (not shown) in call centers 216 examine each request that passes from security 209 to call centers 216.

Database 218 is a database storing information regarding telephone calls. The nature of the information stored in database 218 is, at least partially, determinable by the owner of ACD 206. In one embodiment, database 218 is an Oracle work group server (available from Oracle Corporation of Redwood Shores, Calif.) residing on server 202.

In one embodiment, call center 216 is logic running as a real-time task on a processor of ACD 206. In FIG. 3, call center 216 is shown as a separate cabinet. In other embodiments, however, all server 202 components run on the same machine and in the same memory space as call center 216.

In the embodiments described, an open system architecture is used to allow easy access by non-experts to hardware and software necessary to configure or reconfigure ACD 206. An open system architecture is a set of application programming interfaces (APIs) intended to enable applications from different vendors to communicate with each other, such as over a network.

Figure 4:
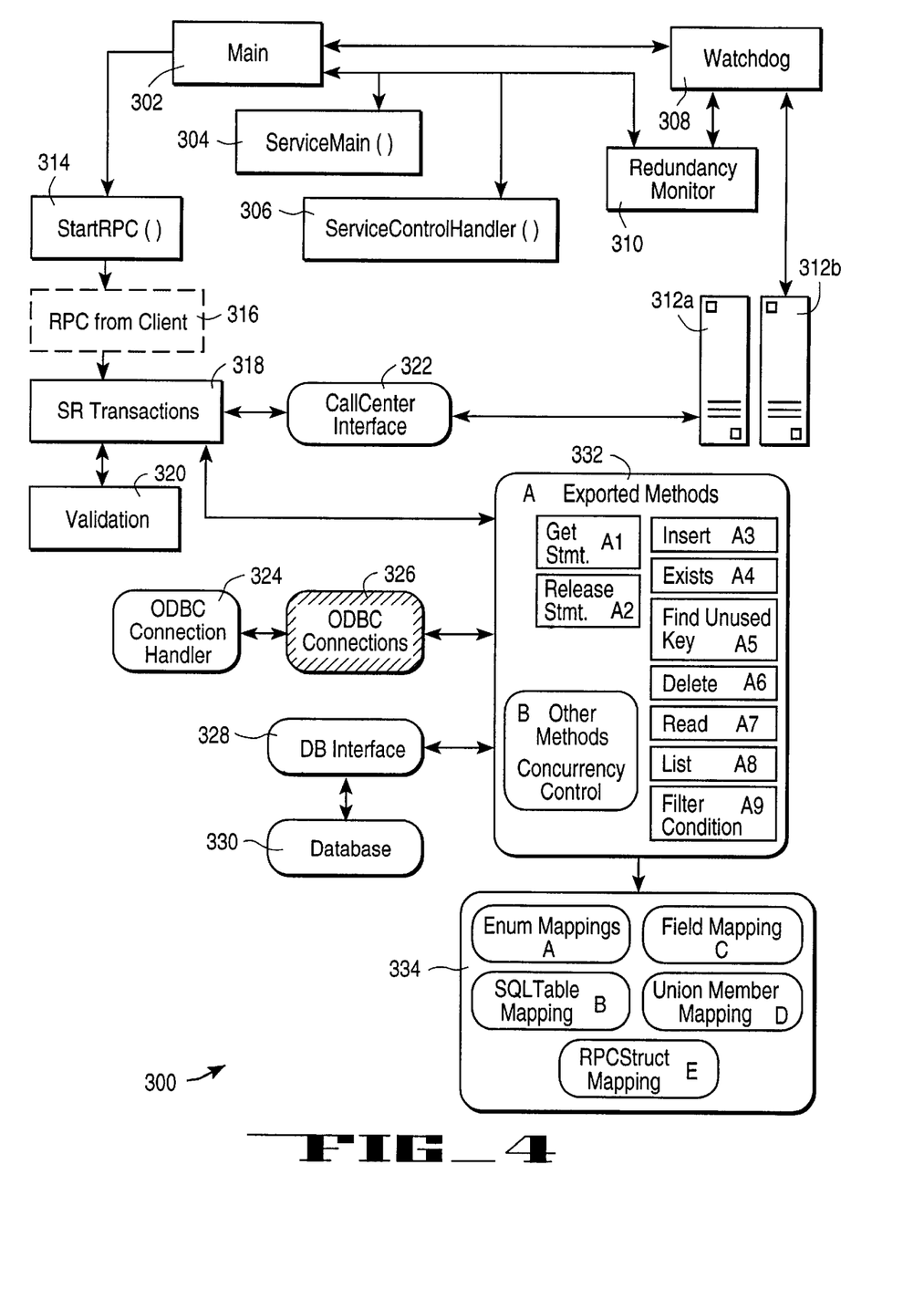
FIG. 4 is a block diagram of the module design of one embodiment of a server.

FIG. 4 is a block diagram of a module design 300 of one embodiment of server 202. Some modules of module design 300 are labeled identically to modules of FIG. 3. These modules have the same functionality in FIG. 4 as in FIG. 3.

Main server section 302 establishes operating environment parameters including task maximums and minimums, open database connectivity (ODBC) connection maximums and minimums, server 202 primary addresses and backup addresses, among other tasks. Main server section 302 establishes a server 202 process as either a console application (for debugging purposes) or as an NT® service, depending on command line options. Main server section 302 also initializes ODBC services and starts the RPC listener, which waits for client requests. Main section 302 also includes utility functionality such as establishing base call center shared memory addresses and creating and maintaining a teletype writer (TTY) emulation table for call center interface 322.

Watch dog task 308 is responsible for orderly start-up and shut-down of call center 312, as well as for keeping track of primary call center 312a status and controlling the switchover to and from backup call center 312b in the event of primary call center 312a failure.

Service main procedure 304 and service control handler procedure 306 are, in this embodiment, NT® service standard procedures. Service main 304 is a standard NT® entry point used by Windows NT®(when initiating the service. Service main 304 is a thread that registers with the NT® service manager in order to handle asynchronous events generated by NT®. The events are generally status reporting events, pause and restart events. Service control handler 306 is a standard NT® entry point for responding to Windows NT® service events. Service control handler 306 is a thread that is created and registered with the NT® services control manager to handle service events.

Redundancy monitor 310 is a persistent thread that constantly evaluates the status of call center 312 by evaluating call center 312 shared memory values related to status at regular intervals. Redundancy monitor 310 may also directly notify a client computer of situations requiring the client computer to automatically attach to a different server (as in a cut-to-backup situation) or that a particular server is unavailable.

Start RPC function 314 starts up the RPC listen function. After the RPC listen function is initialized, client transactions are accepted and passed to SR transactions 318.

RPC 316 is a call passed by a client to ADC 206. RPC 316 passes parameters in the client's real world object view (RWOV). A RWOV is a description of the client object level API. Each RWOV object approximates a set of client views of a group (for example of trunks, cards, etc.) of call center 312 data.

SR transactions 318, in this embodiment, comprise the main application code of the call handling system. All logic to fulfill a particular request from the client RWOV is contained in this section. For example SR transactions 318 validate parameters passed from the client, perform database activities, and perform call center activities. Any processing steps performed by SR transactions 318 may cause an exception that will cancel a database update in process and return an error to the client. Each of SR transactions 318 is designed to perform a particular function. Each of SR transactions 318 includes the following components: SR_start, validation 320, database access, call center interface 322, and SR_end. SR_start is a macro that, with its ending counterpart SR_end, surrounds the application logic of SR transaction 318. In one embodiment, SR_start generates a C++ try statement for error handling. Validation 320 is the application logic that takes a request and its associated record and validates that the record is correct and the action can be performed. Database access can be performed at any time within the SR transaction. Database access is available as a series of single statement transactions, or directly through raw ODBC calls. Call center interface 322 is a module that provides a message translation and transmission/receipt facility to and from call center 312. In one embodiment, the message format in server 202 is slightly different than that of call center 312 (mostly because of the difference between C and C++ reserved words) and therefore translation is sometimes required. SR_end is a macro that must come at the end of the application code.

Database connection 332 is an object module that is instantiated at the beginning of each SR transaction 318. Database connection module 332 encapsulates all database access state and functionality. Exported methods 332A are methods available to SR transaction 318. Each exported method 332A takes as an argument data dictionary 334 describing the database table or tables that will be used in the transaction. Other parameters include a new record to be inserted, an old record to be compared before update, an existing record to be deleted, or a pointer to a memory area to which an array of structures is to be passed. In general, exported methods 332A provide a gateway between the structure and object-based world of the client and the table-based world of relational database management systems (RDBMS). Exported method 332A1, a get statement method, allocates an ODBC statement and returns the statement handle. The SR transaction 318 can perform any ODBC transaction on database 330 using the statement handle. Exported method 332A2, a release statement method, releases the ODBC statement handle allocated by the get statement function. Exported method 332A3 inserts a record into a specified table. Exported method 332A4 checks to see whether a specific record (row) exists. Exported method 332A5 finds an available slot or unused key value for a new row (record). Exported method 332A6 deletes a record from a table. Exported method 332A7 reads a specified record by key. Exported method 332A8 returns a list of records and structures. The set may be all the records of that type in the database or a subset specified by a filter passed by the application. The filter is a standard structured query language (SQL) WHERE clause used for creating a subset of returned records.

Other methods 332B are private methods for database connection object 332 that are used to implement specific features of database access. For example, concurrency control is a set of processing that assures that two or more persons using the system cannot erroneously make conflicting updates to the same record.

Data dictionary 334 is a series of tables contained within the scope of the SR transaction 318. These tables completely describe the relationship of the database information, the RWOV structure data and call center 312 messages. Although building data dictionary 334 is somewhat tedious, the resulting tables make transactions against the database 330 quite simple, usually a matter of a single statement.

Enum mapping 334a is a table that maps database string values to an enumerated list in the structure to be returned to the client. All client RPC logic uses enumerated lists instead of string values for enhanced processing. Some fields in the database are stored as strings but are Enums in the RPC structure. This structure represents the correspondence between one of the string choices and one of the enum values.

SQL table mapping structure 334B ties together all the structures used for mapping the different SQL tables to an RPC structure. In one embodiment, there are two SQL tables for one RPC struct.

Field mapping table 334C is a basic table mapping database field. It describes the column name of the data, the column datatype, and the receiving field structure offset and datatype. There must be one entry in this field for every database table column that will be sent to the client via the RPC struct. This structure details the mapping between one of the database columns and one of the fields in the RPC structure. Union member mapping table 334D is used to describe a database record that contains one or more unions. Each union struct member is first described with a field mapping. RPCstruct mapping structure 334E details relationships between RPC structures (for example, trunk) to more than one SQL table.

ODBC connections 326 represent a persistent link between a server application and database 330. A connection is required to submit any database transactions to the management system of database 330. In one embodiment, for example, database 330 is an Oracle database with an Oracle database management system. Connections are a limited commodity in the Workgroup version of the Oracle database. Therefore, in the embodiment using an Oracle database there is a mechanism to limit the number of connections used, and to release connections that have not been recently used so that other processes can use them. Because starting new connections is a time consuming process, new connections are not created as needed.

ODBC connection handler 324 is a persistent thread started by main section 302. Its functions are two-fold. First, it responds to a request for a connection handled by either returning an existing unused ODBC connection from a persistent connection table or by allocating another connection. Second, at regular time intervals (for example 10 minutes) it calculates a rolling average use for the connections and releases connections if it is unlikely they will be used again within the time interval. ODBC connection handler 324 opens several database connections at system start up and makes them available as needed. This is more efficient than, for example, opening a new database connection each time one is required.

Database connection object 332 controls connections, allocations of resources and deallocation of resources of database 330 through database interface 328. Database interface 328 provides any required translation between database 330 and database connection 332.

Figure 5:
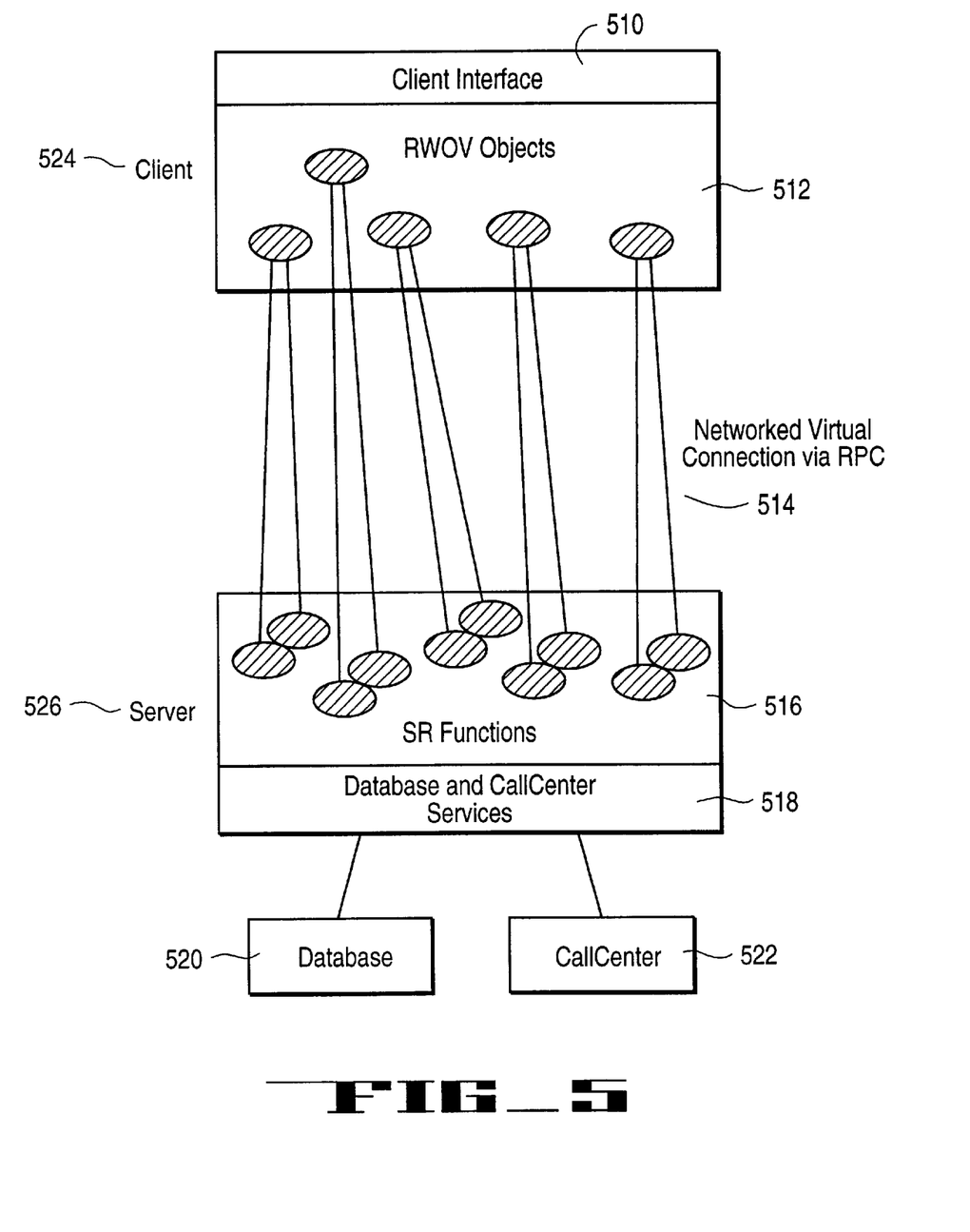
FIG. 5 is a diagram of one embodiment of a client support structure.

FIG. 5 is a diagram of the structure supporting transactions of client 204 according to one embodiment of ACD 206. Functions providing transaction support for client 204 are divided into two major portions, client portion 524 and server portion 526. Client portion 524 presents an interface to the client showing current call center information and allowing requests from the client to change the configuration of the call center. Client portion 524 also performs preliminary field level validation of changes requested by the client. This field level validation is required to give the client a quick response to simple field errors, rather than waiting for a server transaction for each simple field error. Client portion 524 comprises client interface code 510, which controls interaction with the client operating system. Client portion 524 further comprises a layer of RWOV objects 512 which control transaction processing including activation, deactivation, viewing, creation, update, and deletion of call center 216 information. When a user accesses the system through a GUI for the purpose of performing an operation, the user is queried for information regarding both the desired operation and the user. The information provided by the user is used by the client portion to build one or more RWOV objects 512. The RWOV objects 512 are also used to authenticate and validate transactions. This makes it extremely difficult for unauthorized access to a call center to take place, whether attempted by a user at a terminal or by a software program.

Client portion 524 is connected to server portion 526 through networked virtual connection via RPC 514. Server portion 526 provides a set of services to complete a transaction by further validation of the requested transaction, updates to database tables, and messages to the call center and its redundant twin informing them of changes in call center setup. Server portion 526 code includes several SR transaction routines 516 for each client RWOV object. Server portion 526 code further includes a set of support services for these SR functions including a robust server framework, simplified database access and access to call center 216 via messages and shared memory updates.

Server portion 526 further includes database and call center services 518 which connect to database 520 and call center 522 Services performed on database 520 include inserting, updating, deleting, listing, and reading information to and from the database. Services performed on the call center include updating the call center to reflect new configuration information.

Each transaction across a network connection 514 is atomic and represents an indivisible unit of work. All of the actions of a transaction either succeed or fail, returning a specific error code to the client as described from the point of view of the consumer of the transaction (the client). The client transaction should always leave the server in its original state. This means that a client transaction must be completed in a single call to the server, because the server will not store state information across transactions. This makes the architecture of server 202 simpler.

Figure 6:
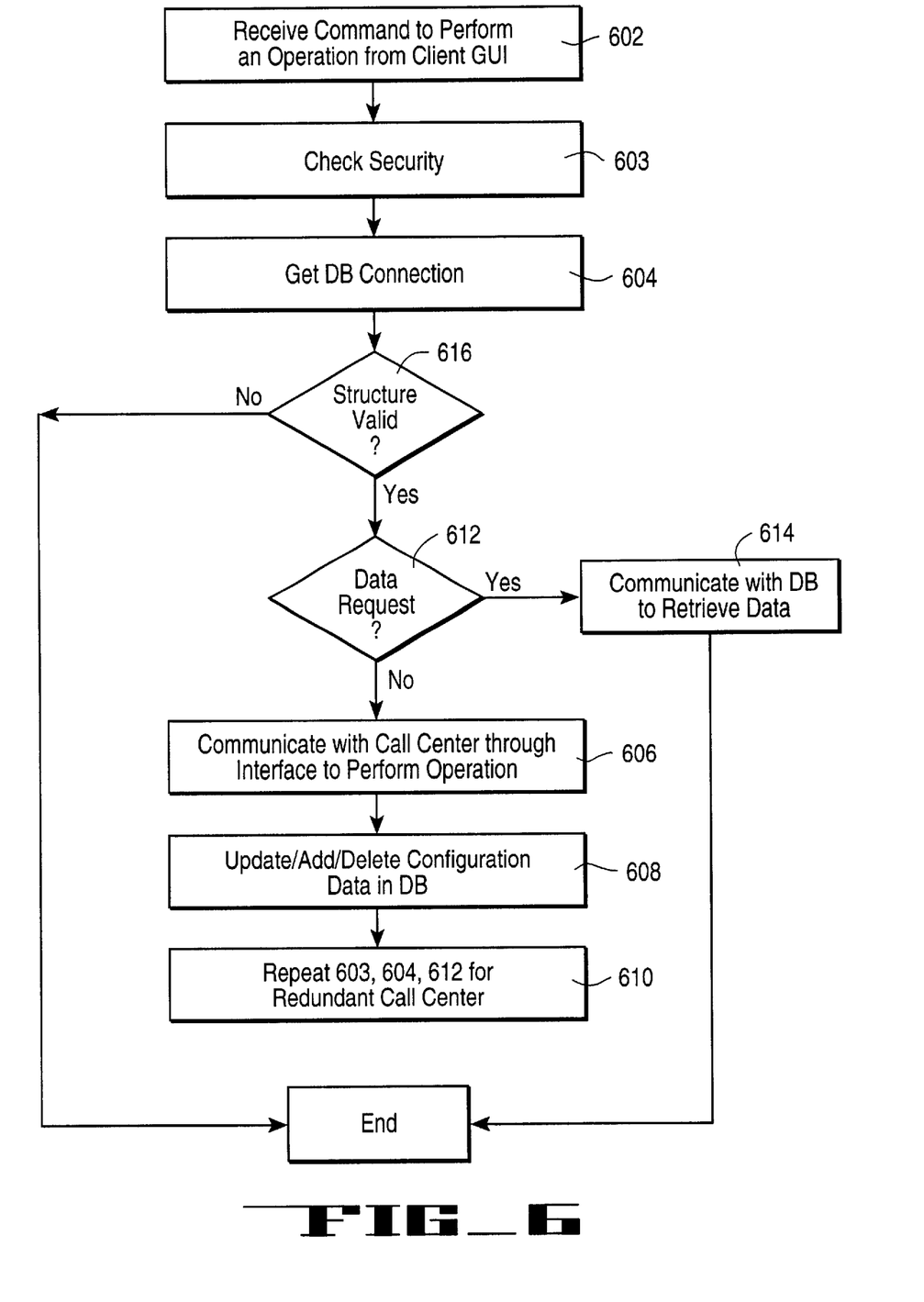
FIG. 6 is a flow diagram of steps performed by a server according to the instructions of one embodiment for each server remote procedure call.

FIG. 6 is a flow diagram showing steps performed by server 202 of FIG. 2 for each SR transaction 208. FIG. 6 will be explained with reference to elements of FIGS. 3. At step 602 server 202 receives a command to perform an operation from client 204. Client 204 includes a graphical user interface (GUI) through which a user may choose from a list of operations or functions.

At step 603, a security check is performed security module 209 of to authenticate the request received. If the request is authenticated, at step 604 server 202 gets a connection to database 218 from a connection handler.

At step 616, server 202 validates a structure received as an argument from client 204. If the structure is not valid, the process ends and an error message is generated to the initiator of the request. If the structure is valid, it is determined at decision block 612, whether the request from client 204 is a request regarding system configuration or a request to view data stored in database 218. If the request is a data request, the database connection is used to communicate with database 218 to retrieve the requested data.

If the request is not a request to access data, at step 606, server 202 communicates with call center 216a through a call center interface in order to perform the specified function. At step 608 any data relating to the operation performed is put in a data record and sent to database 218. The operation performed may be an operation to, update, add, or delete hardware or software of the overall system. The operation may also be an access directly to database 218 to view data regarding system configuration or regarding transactions. For example, data describing a new or changed configuration is recorded so that it may be accessed by any operation requiring the exact configuration of the system. Then, at step 610 steps 603, 604, and 612, and as appropriate, steps 614 or steps 606 and 608 are repeated for redundant call center 216b.

What is claimed is:

1. A method for accessing a transaction processing system, the method including:
   receiving a remote request for access to the transaction processing system from a client device; and
   in response to the remote request, causing a server to execute at least one server function, the at least one server function including performing a security check to authenticate the remote request,
   wherein the remote request is received through a user interface, of a computer terminal, that prompts a user for information related to the user and to the remote request; at least one client object is built using the information; and the client object is used in the performance of the security check.

2. The method of claim 1, further including:
   if the security check indicates that the remote request is authentic, getting a database connection to a database; and
   validating a structure that is passed from the client device to the server.

3. The method of claim 2, further including:
   determining whether the remote request is a request to access data in the database; and
   if the remote request is a request to access data in the database, communicating with the database to retrieve the data.

4. The method of claim 3, further including:
   if the remote request is a not a request to access data in a database, communicating with a transaction center to perform a configuration operation;
   creating a record of the operation performed; and
   storing the record in the database.

5. The method of claim 4, further including:
   connecting to a redundant transaction center to perform the configuration operation.

6. The method of claim 1, wherein the remote request is in a standard software format including a remote procedure call (RPC).

7. The method of claim 4, wherein the at least one client object approximates a set of client views of a group of transaction center data.

8. The method of claim 7, wherein the group of transaction center data includes data relating to:

integrated circuit cards;

trunks;

client devices; and levels of client access permission.

9. The method of claim 7, wherein performing the configuration operation includes at least one application programming interface (API), wherein at least one API is associated with each client object.

10. A transaction processing system including:

a transaction center to process transactions received, including routing transactions to a plurality of client devices;

a database coupled to the transaction center; and a server coupled to the transaction center and to the plurality of client devices, wherein the server receives a remote request for access to the transaction center, and, in response, accesses the transaction center to perform an action and accesses the database to store data related to the action performed, wherein the remote request is received through a user interface, of a computer terminal, that prompts a user for information related to the user and to the remote request; at least one client object is built using the information; and the client object is used in the performance of a security check.

11. The transaction processing system of claim 10, further including a call center for processing telephone calls.

12. The transaction processing system of claim 10, further including a backup transaction center identical to the transaction center.

13. The transaction processing system of claim 10, wherein the remote request is in a standard form including a remote procedure call (RPC).

14. The transaction processing system of claim 11, wherein the transaction center is coupled to a public switched telephone network (PSTN).

15. A machine-readable medium storing a sequence of instructions which, when executed by the machine, cause the machine to:

receiving a remote request for access;

in response to receipt of the remote request, causing a server to perform at least one server function, the at least one server function including:

connecting to a database;

validating a structure of the remote request;

connecting to a transaction center to perform a function related to the remote request; and modifying a record of the database to reflect the function performed, wherein the remote request is received through a user interface, of a computer terminal, that prompts a user for information related to the user and to the remote request; at least one client object is built using the information; and the client object is used in the performance of a security check.

16. The machine-readable medium of claim 15, wherein the at least one server function further includes:

connecting to a redundant transaction center to perform the function related to the remote request; and modifying a record of the database to reflect the function performed.

17. The machine-readable medium of claim 16, wherein the remote request is in a standard software format including a remote procedure call (RPC).

18. The machine-readable medium of claim 15, wherein the remote request includes at least one client object approximating a set of client views of a group of transaction center data.

19. The machine-readable medium of claim 18, wherein the group of transaction center data includes data relating to:

integrated circuit cards;

client devices; and levels of client permission for access to the transaction center.

20. The machine-readable medium of claim 18, wherein the at least one server function includes at least one application programming interface (API), wherein the at least one API is associated with each client object.

21. The machine-readable medium of claim 15, wherein the remote request includes a request to change a configuration of the transaction processing system.

22. The machine-readable medium of claim 15, wherein the remote request includes a request for information stored in the database.

* * * * *